(12) United States Patent
Lamstein

(10) Patent No.: US 7,150,245 B2
(45) Date of Patent: Dec. 19, 2006

(54) CATNIP ENCASED PET TOY

(76) Inventor: Aaron M. Lamstein, 160 Mitchell Rd., San Rafael, CA (US) 94903-2044

( * ) Notice: Subject to any disclaimer, the term of this patent is extended or adjusted under 35 U.S.C. 154(b) by 179 days.

(21) Appl. No.: 11/024,397

(22) Filed: Dec. 23, 2004

(65) Prior Publication Data

US 2006/0137624 A1    Jun. 29, 2006

(51) Int. Cl.
*A01K 29/00*    (2006.01)
(52) U.S. Cl. .................................... 119/711
(58) Field of Classification Search ........... 119/709, 119/710, 711
See application file for complete search history.

(56) References Cited

U.S. PATENT DOCUMENTS

| | | | |
|---|---|---|---|
| 1,534,964 A * | 4/1925 | Kahnweiler ............ | 119/711 |
| 5,009,193 A * | 4/1991 | Gordon ................ | 119/711 |
| 6,178,922 B1 * | 1/2001 | Denesuk et al. ........ | 119/710 |
| 6,237,538 B1 * | 5/2001 | Tsengas ............... | 119/707 |
| 6,629,770 B1 | 10/2003 | Blatherwick ........... | 362/363 |
| 6,663,457 B1 * | 12/2003 | Ritchey ............... | 446/71 |

* cited by examiner

*Primary Examiner*—Robert P. Swiatek

(57) ABSTRACT

A toy for use by domestic cats. The toy includes a spherical body portion made of pelletized materials and an interior portion. The interior portion contains a quantity of catnip and the shell has an opening to introduce and remove the quantity of catnip from the interior portion. The shell is characterized as permitting odors emanating from the catnip to pass therethrough.

1 Claim, 1 Drawing Sheet

CATNIP ENCASED PET TOY

TECHNICAL FIELD OF THE INVENTION

A vast array of toy products are designed for a wide variety of domestic animals. Cat toys including those containing catnip abound. However, there are a number of design considerations for such toys recognizing the need for durability and delivery of the visceral effects of the catnip while offering a safe and convenient product which are addressed by the present invention.

BACKGROUND OF THE INVENTION

The effect of catnip on virtually on all feline species is well known. Catnip or *Nepatia cataria* is a plant native to North America. The dried leaves of the catnip plant express a mint-like scent. Catnip has a hallucinogenic effect upon cats, although it is not toxic. This "catnip response" is due to the plant's active ingredient, nepetalacetone.

When a cat smells catnip, it characteristically exhibits a range of behaviors somewhat dependent upon the age of the cat and whether it is capable of reproduction. Most reactions last from five to fifteen minutes and include sniffing, licking and chewing, chin and cheek rubbing, and head-over roll and body rubbing. The feline receptor for the active ingredient, nepetalacetone, is contained with the animal's vomeronasal organ located above the feline palate. The location of the vomeronasal organ may explain why cats do not react from eating gelatin capsules of catnip. Nepetalacetone must be inhaled for it to reach the receptors in the organ.

A number of manufacturers have included catnip in toy products. However, doing so has represented certain design and manufacturing limitations which, heretofore, have remained unsolved.

Recognizing the need to create a pet toy which provides for the passage of the catnip scent, virtually all such toys are plush in nature having been constructed of cloth or fiber sidewalls for gas permeability. However, because of the rather vigorous catnip response anticipated when the toy is employed, such plush construction breaks down resulting in the toy's rather short in-field use. This problem is particularly acute noting that most pet toys are of modest construction for these toys tend to sell at low prices and thus are not produced in such a manner as to encourage long term in-field survivability. This problem is further significant in noting that if a plush toy was to be completely destroyed or at least compromised, a cat may have the opportunity to ingest a rather large quantity of catnip contained therein which could represent a significant health hazard.

Although a molded plastic would represent a more durable pet toy, the use of plastics in making a catnip-enhanced product has not been widespread. The reason for this is that plastic or rubber toys have not inherently provided the necessary gas permeable to provide the cat with the desired catnip response.

It is thus the object of the present invention to provide a more durable pet toy which can be effectively used with catnip as an effective catnip-enhanced cat toy.

This and further objects will be more readily apparent when considering the following disclosure and appended claims.

SUMMARY OF THE INVENTION

The present invention is directed to a toy for use by domestic cats comprising a substantially spherical body portion comprised of a shell made of pelletized materials and an interior portion. The interior portion contains a quantity of catnip while the shell is provided with an opening to introduce and remove catnip from the interior portion of the spherical body. It is a specific design goal of the present invention to provide a shell characterized as permitting odors emanating from the catnip to pass therethrough.

DETAILED DESCRIPTION OF THE INVENTION

Figure 1:
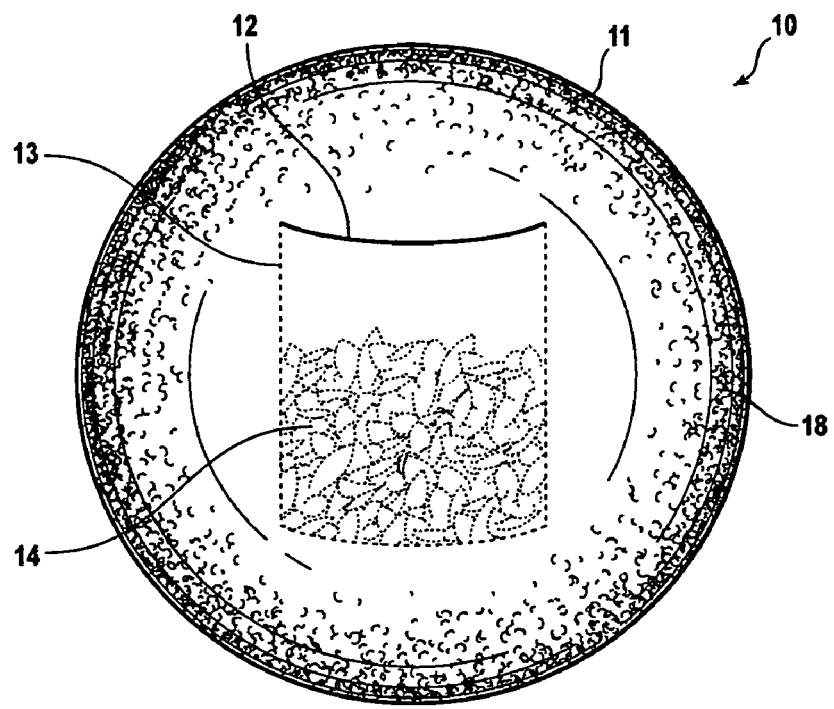
FIG. 1 is a perspective view of the toy of the present invention.

Turning first to FIG. 1, toy 10 is depicted which, as noted previously, is a toy intended for use by domestic cats. Toy 10 can be of a variety of shapes however the most ideal shape is spherical whereby shell 11 is made of pelletized materials creating interior portion 18 which includes a quantity of catnip 14. Although catnip 14 can simply be introduced to interior portion 18 as loose leafy flakes, receptacle 13 can be provided for maintaining catnip 14 within a confined volume within interior portion 18.

Figure 2:
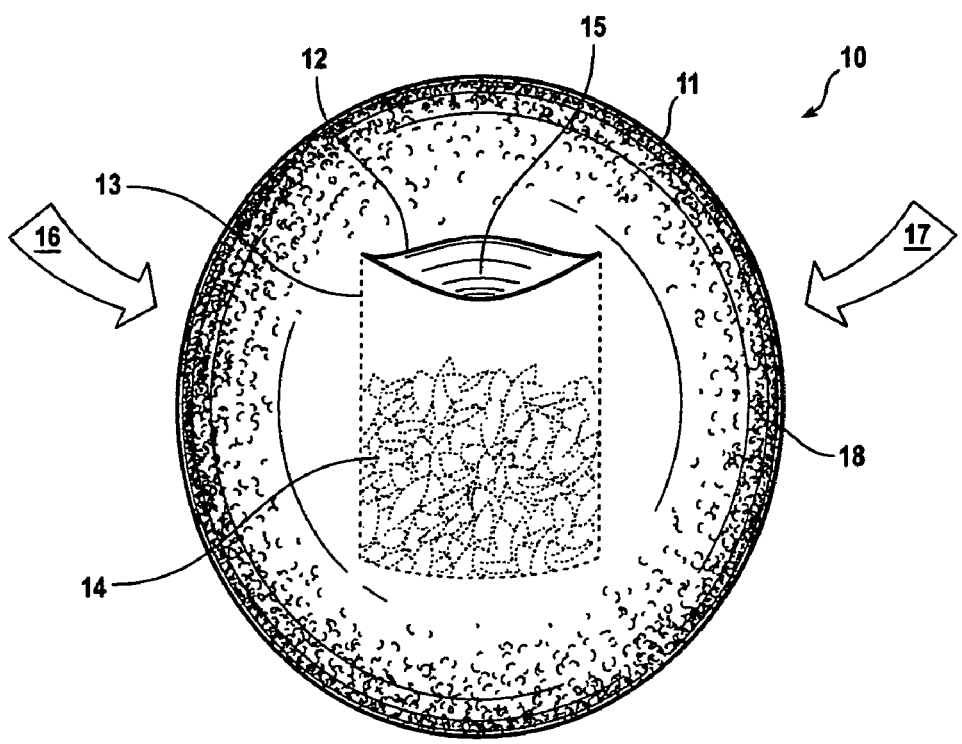
FIG. 2 depicts the toy of FIG. 1 showing an embodiment for adding and removing catnip thereto.

Shell 11 is further provided with a means for introducing fresh catnip to interior space 18. Catnip tends to age over time and the desired mint-odor creating the catnip response dissipates as catnip ages. As such, noting the relative durability of toy 10, it is anticipated that a user would find it desirable to replace catnip 14 periodically to reenergize toy 10 over time. As shown in FIGS. 1 and 2, one way of opening the interior portion 18 for removing spent catnip and providing a fresh supply of this leafy material is through the use of a slit opening 12 which, when spherical body portion 11 is left at rest, creates a narrow slit preventing any solid material from entering or exiting interior portion 18. However, when a user places pressure as shown schematically by arrows 16 and 17 upon shell 11, slit 12 opens creating opening 15 for direct access to receptacle 13 and catnip 14 contained therein. However, as noted previously, virtually any means of providing selective access to interior portion 18 is contemplated for use herein. For example, one could employ a frictionally fit plug or screw in cap to perform this same function.

The desired combination of durability and gas permeability is created by employing a polymeric material such as that disclosed in U.S. Pat. No. 6,629,770, the disclosure of which is incorporated by reference. This material creates body portion 11 having soft and rough surfaces creating varying degrees of gas permeability.

Body portion 11 is created by filling a mold with pellets of ethylene vinyl acetate. Ideally, a rotating processing machine is employed which automatically rotates as the mold is heated to an appropriate operating temperature at about 250° C. As a result of the molding and heating process, pelletized ethylene vinyl acetate copolymers are created having a discreet, particular pelletized shape. The resulting product forming spherical body 11 is essentially a collection of heated, cooled and bonded pelletized ethylene vinyl acetate copolymers which retain their discreet, pelletized shapes. What is formed is a surface having smooth glassy portions and rough coarse portions. Gas is able to permeate this surface providing the requisite catnip odor penetration.

As such, the cat receives the requisite catnip enhancement while providing a toy which can be abused by the domestic cat while representing a degree of durability far in excess of that offered by previously available plush toys.

The invention claimed is:

1. A toy used by domestic cats comprising a substantially spherical body portion comprised of a shell made of pelletized ethylene vinyl acetate copolymers having soft and rough surfaces creating varying degrees of gas permeability and an interior portion, said interior portion containing a quantity of catnip and said shell having an opening to introduce and remove said quantity of catnip from said interior portion.

* * * * *